United States Patent [19]

Pollman et al.

[11] Patent Number: 5,539,605

[45] Date of Patent: Jul. 23, 1996

[54] DIGITAL CIRCUIT INTERRUPTER UNDERVOLTAGE RELEASE ACCESSORY

[75] Inventors: John A. Pollman, Seymour; Raymond K. Seymour, Plainville; Paul H. Singer, West Hartford, all of Conn.

[73] Assignee: General Electric Company, New York, N.Y.

[21] Appl. No.: 248,973

[22] Filed: May 25, 1994

[51] Int. Cl.⁶ ................................................. H02H 3/24
[52] U.S. Cl. .................................................. 361/92; 361/93
[58] Field of Search ............................. 361/42, 44, 45, 361/46, 90, 92, 93, 94

[56] References Cited

U.S. PATENT DOCUMENTS

| | | | |
|---|---|---|---|
| 4,156,884 | 5/1979 | Eckart et al. | 361/46 |
| 4,335,413 | 6/1982 | Engel et al. | 361/93 |
| 4,672,501 | 6/1987 | Bilac et al. | 361/93 |
| 4,801,907 | 1/1989 | Kelaita, Jr. et al. | 361/93 |
| 4,833,563 | 5/1989 | Russell | 361/92 |
| 4,870,531 | 9/1989 | Danek | 361/93 |

OTHER PUBLICATIONS

Pollman et al "Digital Circuit Interrupter Shunt Trip Accessory Module". U.S. Ser No.: 08/247,198 filed May 20, 1994.
Castonguay et al. U.S. Ser. No. 08/214,522 filed Mar. 18, 1994.

*Primary Examiner*—Jeffrey A. Gaffin
*Assistant Examiner*—Ronald W. Leja
*Attorney, Agent, or Firm*—Richard A. Menelly

[57] ABSTRACT

An integrated circuit breaker is described having undervoltage trip capability along with automatic overcurrent protection. The undervoltage accessory further provides auxiliary power to the trip unit and allows the trip unit to report and record the undervoltage release operation.

11 Claims, 2 Drawing Sheets

5,539,605

DIGITAL CIRCUIT INTERRUPTER UNDERVOLTAGE RELEASE ACCESSORY

BACKGROUND OF THE INVENTION

U.S. Pat. No. 4,672,501 entitled "Circuit Breaker and Protective Relay Unit" describes the use of a digital circuit interrupter employing a microprocessor in combination with ROM and RAM memory elements to provide both relaying as well as protection function to an electrical distribution system. U.S. Pat. No. 4,801,907 entitled "Undervoltage Release Accessory for a Circuit Breaker Interior" describes an undervoltage release accessory that directly interacts with the circuit breaker operating mechanism trip bar to separate the circuit breaker contacts.

The accessory must be inserted within the circuit breaker enclosure next to the operating mechanism to enable contact with the circuit breaker trip bar.

U.S. patent application Ser. No. 08/247,198 entitled "Digital Circuit Interrupter Shunt Trip Accessory Module" describes a shunt trip module that interacts with the circuit breaker electronic trip unit to separate the circuit breaker contacts by means of the trip unit flux shifter assembly. The shunt trip unit further provides operating power to the trip unit to insure operation of the trip unit when the associated current transformers are not active.

In those arrangements wherein a plurality of electronic circuit breakers communicate within an electrical distribution system, the operation of the circuit breaker trip unit to institute the trip function allows announcement of the trip operation of one of the circuit breakers to the other devices within the system.

The subject invention proposes an undervoltage release module that interacts with the circuit breaker trip unit in a manner similar to the shunt trip module to provide undervoltage release facility as well as to communicate and display the undervoltage release operation.

SUMMARY OF THE INVENTION

An integrated circuit breaker is described having undervoltage release capability along with automatic overcurrent protection. An independent undervoltage release module provides auxiliary power to the trip unit to enable the trip unit microprocessor and allow the microprocessor to report, display and record the undervoltage release operation.

DESCRIPTION OF THE PREFERRED EMBODIMENT

Figure 1:
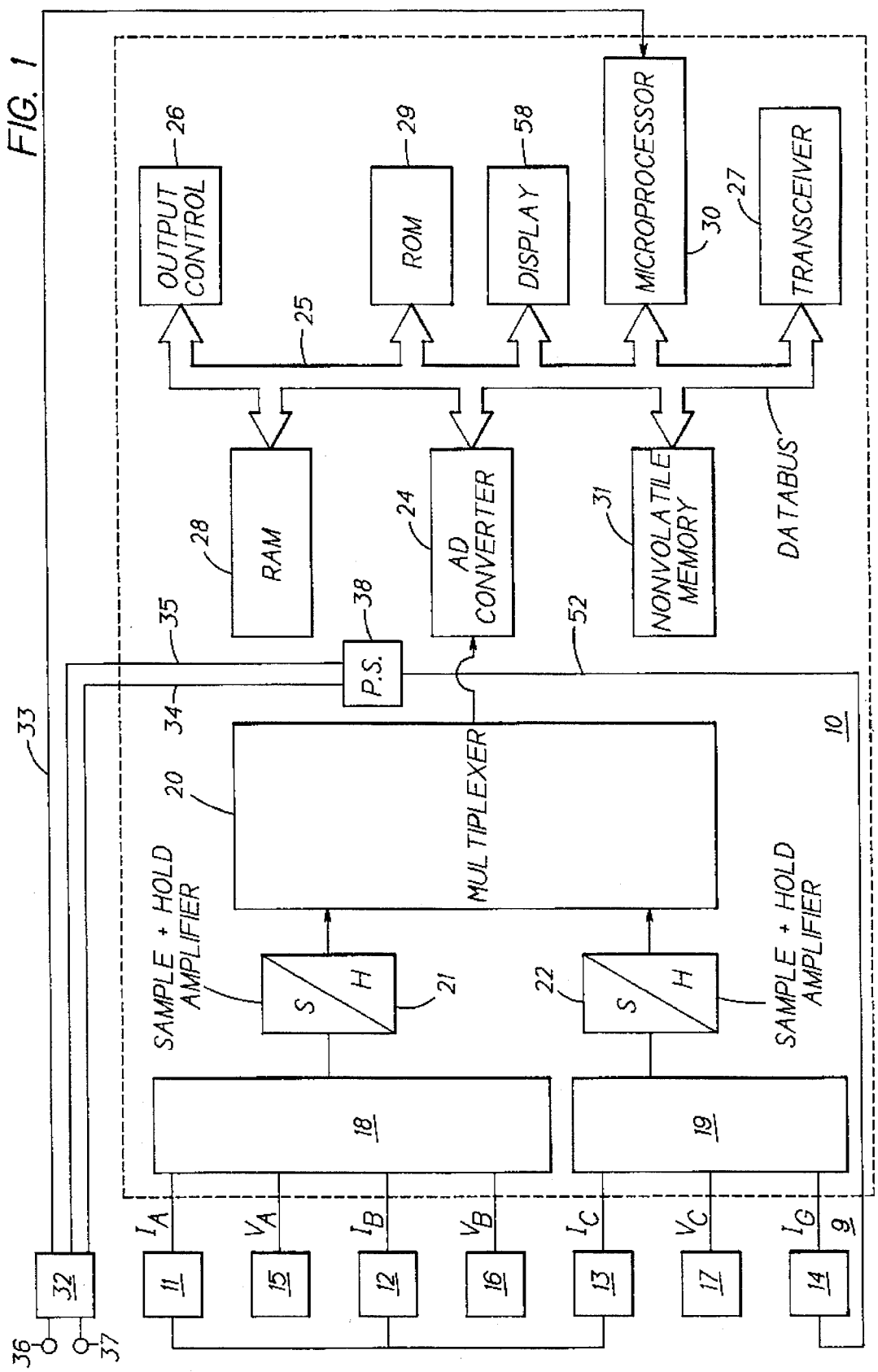
FIG. 1 is a schematic representation of a digital circuit interrupter that includes the undervoltage release module according to the invention.

As described within the aforementioned U.S. Pat. No. 4,672,501 a circuit breaker controller 9 such as depicted in FIG. 1 is contained on a trip unit printed circuit card 10 to which external connection is made with current transformers 11–14 and potential transformers 15–17. The electrical input is transmitted through multiplexers 18–20 and sample and hold amplifiers 21,22 to an A/D converter 24 by and control is achieved by utilization of a data bus 25 which is interconnected with an output control 26, transceiver 27, and RAM 28. The ROM 29, microprocessor 30 and nonvolatile memory 31 operate in the manner described therein to insure complete overall circuit protection. The information as to the status of the circuit breaker contacts (not shown) that are controlled by the output control 26 is displayed on the display 58 that is similar to that described in U.S. Pat. No. 4,870,531 entitled "Circuit Breaker removable Display and Keyboard". In accordance with the invention, undervoltage release facility is provided by connection of an undervoltage release module 32 with the microprocessor 30 and the trip unit power supply 38 by means of conductors 33, 34 and 35. Operating power to the trip unit power Supply is provided by the current transformers 11–13 over conductor 52 when the associated electrical distribution system is operational. Supplemental operating power is supplied to the trip unit power supply by the undervoltage release module 32 upon application of a voltage signal by the user over input terminals 36, 37.

Figure 2:
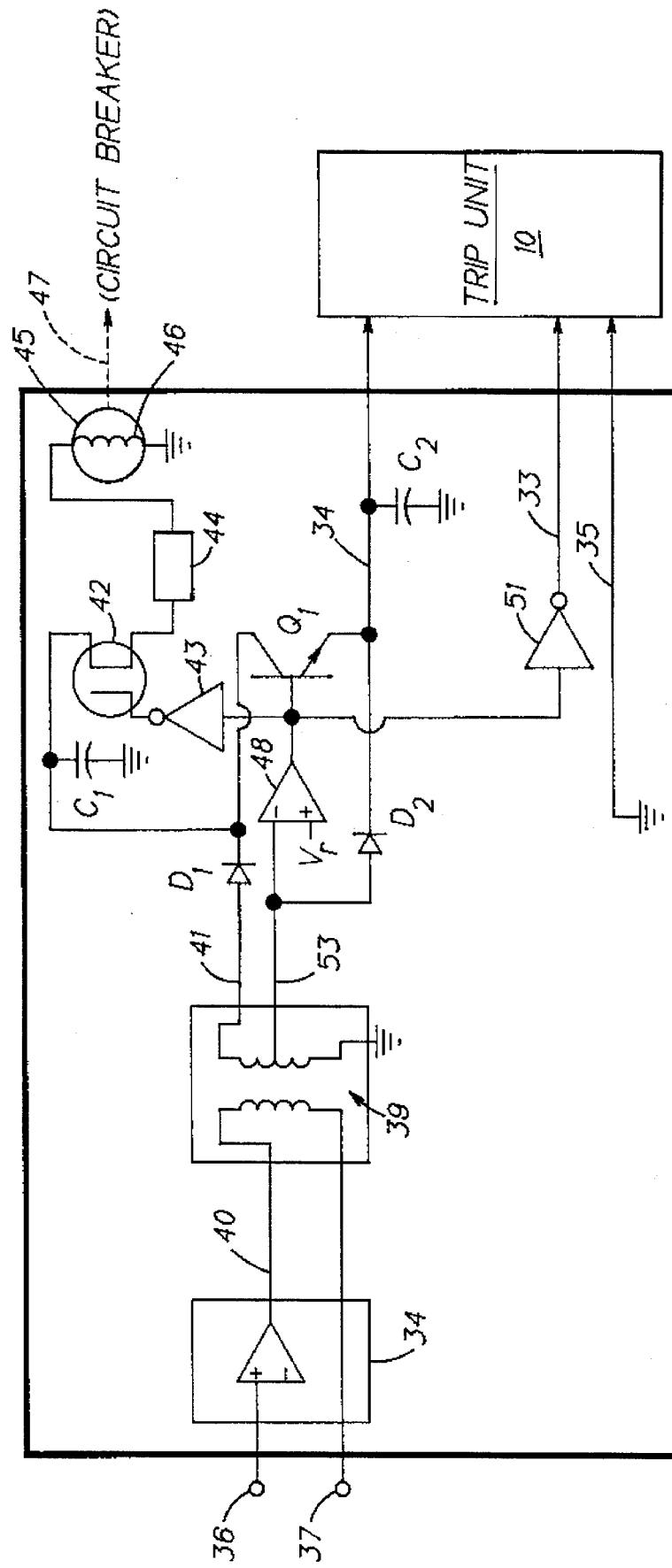
FIG. 2 is an enlarged diagrammatic representation of the components within the undervoltage release module of FIG. 1.

The functional components of the undervoltage release module 32 are depicted in FIG. 2. The voltage signal supplied to inputs 36, 37 is inputted to the comparator circuit 34' from a signal source for comparison to a predetermined undervoltage reference value in the manner described within the aforementioned U.S. patent application Ser. No. 08/247, 198. The voltage signal is inputted over conductor 40 to a three output winding isolation transformer 39. The first output winding connects through conductor 41 and first blocking diode D1 to one terminal of FET 42 and one side of a large capacity storage capacitor C1. The other terminal of the FET connects through a current regulator 44 to one side of the control winding 46 within the solenoid 45. The current regulator 44 is a pulse width modulator unit is a Unitrode type 2524 which is similar to the 3843 as described within the aforementioned U.S. patent application. The solenoid armature operatively interacts with the circuit breaker operating mechanism as indicated at 47 to prevent the operating mechanism closing springs from driving the circuit breaker contacts to their closed condition. One such circuit breaker closing arrangement is found, for example, in U.S. patent application Ser. No. 08/214,522 filed Mar. 14, 1994 entitled "Handle Operator Assembly for High Ampere Rated Circuit Breakers". The second output winding connects through conductor 53 with the inverting input of a comparator 48 for comparison with a reference value applied to the non-inverting input. The second output winding also connects through a second blocking diode D2 and conductor 34 with the base of the transistor switch Q1, one side of the second storage capacitor C2 and with the trip unit 10, as described earlier with reference to FIG. 1. The output of the comparator 48 connects with the gate of the FET 42 through a first inverter 43 and with the trip unit 10 through a second inverter 51 and the conductor 33. Ground connection between the trip unit 10 and the undervoltage release circuit 32 is supplied by means of conductor 35.

The operation of the undervoltage release is as follows. When less than 30% of the system voltage is applied to terminals 36, 37, no output signal voltage on conductor 41 is inputted to the solenoid winding 45. Since the solenoid 46 is thus de-energized, the solenoid by means of the operative interaction 47, prevents releasing the circuit breaker closing springs as described in the aforementioned U.S patent application Ser. No. 08/214,522 as long as the FET remains off. This arrangement insures that the charged closing springs will not release when the circuit breaker contacts closure is attempted, and thereby subject the distribution system protected the circuit breaker to undesired breaker closure. If at least 80% of the system voltage appears at terminals 36 and 37 it causes the voltage at the inverting input to the comparator to be lower the reference value applied to the non-inverting input. This causes a "low" (0) to appear at the output of the comparator 48 which prevents the transistor switch Q1 from turning on. The low comparator output also prevents conductor 33 from indicating a trip condition to the trip unit 10. The low also turns on the FET 42 through inverter 43 and energizes solenoid 46 with the current regulator 44. This allows the circuit breaker to close, while allowing the voltage input to power trip unit over conductor 34. As soon as the voltage signal to the input terminals 36, 37 drops to less than 30% of the system voltage, this causes conductor 53 to go lower than the non-inverting input. A "high" (1) then appears at the output of the comparator causing the transmission of a trip signal to the trip unit to separate the circuit breaker contacts. The FET turns off and allows the solenoid to open and thereby prevent the circuit breaker closing springs to become operational to close the circuit breaker contacts until the system's voltage returns to its full value. Once the high occurs at the output of the comparator upon the occurrence of the undervoltage condition, the voltage stored across C1 adds to the voltage across C2 to provide operating power to the trip unit after the undervoltage release has occurred to allow the information to be stored within the trip unit microprocessor.

An undervoltage release module has herein been described that provides a trip signal to the circuit breaker trip unit to separate the circuit breaker contacts upon occurrence of an undervoltage condition. The undervoltage release module interacts with the circuit breaker operating mechanism to insure that the circuit breaker closing does not occur unless and until the undervoltage release is energized with a minimum of 80% nominal line voltage.

Supplemental power is provided by the undervoltage release module during the time that the circuit breaker contacts are closed as well as for a short period after the contacts have become separated by operation of the undervoltage release module and the circuit breaker trip unit.

We claim:

1. An electronic circuit interrupter having overcurrent and undervoltage circuit interruption comprising:

transformer means (11–13) arranged for connection with an electrical distribution system;

a trip unit (10) connecting with said transformer means receiving sample current signals from said distribution system to determine the occurrence of an overcurrent condition;

trip initiating means (26) connecting with said trip unit for interrupting current transfer through said electrical distribution circuit;

power supply means (38) within said trip unit connecting with said transformer means and providing operational power to said trip unit;

an undervoltage release circuit (32) connecting with said trip unit and with said distribution system, for comparing a voltage signal from said distribution system to a reference value and outputting an undervoltage release signal to said trip unit when said voltage signal is lower than said reference value, said undervoltage release circuit connects with said power supply means and provides operating power to said trip unit when said transformer means are inactive; and an isolation transformer (39) having a primary winding connecting with a comparator circuit and a multi-turn secondary winding connecting with a first storage capacitor and said trip unit for providing power to said trip unit after said trip unit has responded to said undervoltage release signal.

2. The electronic circuit interrupter of claim 1 further including a comparator and a first inverter connected in series within said undervoltage release circuit, said first inverter outputting a control signal to said trip unit circuit when said comparator has determined that said voltage signal is lower than said reference value.

3. The electronic circuit interrupter of claim 1 further including a first transistor switch (42) having a first terminal connecting with a first secondary winding on said isolation transformer and a second terminal connecting with a solenoid (45).

4. The electronic circuit interrupter of claim 3 wherein said second terminal connects with said solenoid through a current regulator (44).

5. The electronic circuit interrupter of claim 3 including a second secondary winding on said isolation transformer connecting with a test input to a comparator (48).

6. The electronic circuit interrupter of claim 5 wherein said second secondary winding further connects with said power supply means (38).

7. The electronic circuit interrupter of claim 5 including a second transistor switch connecting between said second secondary winding and said trip unit.

8. The electronic circuit interrupter of claim 7 wherein a gate on said second transistor switch connects with said comparator output thereby providing said undervoltage release signal to said trip unit when said comparator output is high.

9. The electronic circuit interrupter of claim 8 wherein said comparator output further connects with a gate terminal on said first transistor switch.

10. The electronic circuit interrupter of claim 8 wherein said comparator output further connects with said gate on said first transistor switch through a second inverter (43).

11. The electronic circuit interrupter of claim 8 further including a second storage capacitor (C2) connecting with said second secondary winding and said trip unit for providing power to said trip unit after said trip unit has responded to said undervoltage release signal.

* * * * *